United States Patent
Arad

(10) Patent No.: US 10,708,200 B2
(45) Date of Patent: Jul. 7, 2020

(54) TRAFFIC MANAGEMENT IN A NETWORK SWITCHING SYSTEM WITH REMOTE PHYSICAL PORTS

(71) Applicant: Marvell Israel (M.I.S.L) Ltd., Yokneam (IL)

(72) Inventor: Carmi Arad, Nofit (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 41 days.

(21) Appl. No.: 15/599,218

(22) Filed: May 18, 2017

(65) Prior Publication Data
US 2017/0339075 A1    Nov. 23, 2017

Related U.S. Application Data

(60) Provisional application No. 62/338,348, filed on May 18, 2016.

(51) Int. Cl.
*H04L 12/935* (2013.01)
*H04L 12/931* (2013.01)
(Continued)

(52) U.S. Cl.
CPC .......... *H04L 49/9084* (2013.01); *H04L 47/11* (2013.01); *H04L 47/6255* (2013.01); *H04L 49/3027* (2013.01); *H04L 49/506* (2013.01)

(58) Field of Classification Search
None
See application file for complete search history.

(56) References Cited

U.S. PATENT DOCUMENTS

| 7,016,352 B1 | 3/2006 | Chow et al. |
| 8,625,594 B2 | 1/2014 | Safrai et al. |

(Continued)

FOREIGN PATENT DOCUMENTS

| EP | 0960536 B1 | 8/2003 |
| EP | 1 885 139 A1 | 2/2008 |

(Continued)

OTHER PUBLICATIONS

IEEE Std 802.1Q, 2003 Edition, "IEEE Standards for Local and Metropolitan area networks—Virtual Bridged Local Area Networks," The Institute of Electrical and Electronics Engineers, Inc., 327 pages (May 7, 2003).

(Continued)

*Primary Examiner* — Edan Orgad
*Assistant Examiner* — Emmanuel K Maglo

(57) ABSTRACT

A switching system includes a port extender device coupled to a central switching device. Packets processed by the central switching device are forwarded to the port extender device and enqueued in ones of a plurality of egress queues in the port extender device for transmission of the packets via the front ports of the port extender device. Respective egress queues in the port extender device have a queue depth that is less than a queue depth of corresponding respective egress queues in the central switching device. A flow control message indicative of congestion in a particular egress queue of the port extender device is generated and transmitted to the central switch device to control transmission of packets from the central switching device to the particular egress queue of the port extender device.

12 Claims, 7 Drawing Sheets

(51) Int. Cl.
*H04L 12/861* (2013.01)
*H04L 12/801* (2013.01)
*H04L 12/863* (2013.01)

(56) References Cited

U.S. PATENT DOCUMENTS

| | | | |
|---|---|---|---|
| 8,804,733 B1 | 8/2014 | Safrai et al. | |
| 9,042,405 B1 | 5/2015 | Safrai | |
| 9,258,219 B1 | 2/2016 | Safrai et al. | |
| 2005/0005021 A1* | 1/2005 | Grant | H04L 47/10 709/232 |
| 2007/0147364 A1* | 6/2007 | Palacharla | H04L 45/583 370/389 |
| 2012/0093034 A1* | 4/2012 | Kamath | H04L 49/30 370/255 |
| 2013/0262711 A1* | 10/2013 | Louzoun | G06F 9/4411 710/9 |
| 2014/0010083 A1* | 1/2014 | Hamdi | H04L 47/193 370/235 |
| 2014/0052836 A1* | 2/2014 | Nguyen | H04L 45/306 709/223 |
| 2014/0129714 A1* | 5/2014 | Hamdi | H04L 45/60 709/226 |
| 2015/0244629 A1* | 8/2015 | Sinha | H04L 47/18 370/236 |
| 2016/0315879 A1* | 10/2016 | Morris | H04L 49/70 |
| 2016/0380924 A1* | 12/2016 | Sivasankar | H04L 43/12 370/419 |
| 2017/0063668 A1* | 3/2017 | Sivasankar | H04L 45/18 |
| 2017/0339062 A1 | 11/2017 | Mayer-Wolf et al. | |

FOREIGN PATENT DOCUMENTS

| | | |
|---|---|---|
| EP | 2911352 A2 | 8/2015 |
| WO | WO-2013/082407 A1 | 6/2013 |

OTHER PUBLICATIONS

IEEE Std 802.1Q-2011 (Revision of IEEE Std.802.1Q-2005), "IEEE Standard for Local and Metropolitan Area Networks—Media Access Control (MAC) Bridges and Virtual Bridged Local Area Networks," The Institute of Electrical and Electronics Engineers, Inc., 1,365 pages (Aug. 31, 2011).

IEEE P802.1aq/D4.6, Draft Amendment to IEEE Std 802.1Q-2011, "IEEE Draft Standard for Local and Metropolitan Area Networks—Media Access Control (MAC) Bridges and Virtual Bridged Local Area Networks—Amendment XX: Shortest Path Bridging," The Institute of Electrical and Electronics Engineers, Inc., 363 pages (Feb. 10, 2012).

IEEE P802.1ad/D6.0, Draft Amendment to IEEE Std 802.1Q, "IEEE Draft Standard for Local and Metropolitan Area Networks—Virtual Bridged Local Area Networks—Amendment 4: Provider Bridges," *The Institute of Electrical and Electronics Engineers, Inc.*, 60 pages, (Aug. 17, 2005).

IEEE Std 8021Q™-2014 (Revision of IEEE Std.802.1Q-2011), "IEEE Standard for Local and Metropolitan Area Networks—Bridges and Bridged Networks," The Institute of Electrical and Electronics Engineers, Inc., 1,832 pages (Nov. 3, 2014).

IEEE Std 802.3-2002, "IEEE Standard for Information technology—Telecommunications and information exchange between systems—Local and metropolitan area networks—Specific requirements, Part 3: Carrier sense multiple access with collision detection (CSMA/CD) access method and physical layer specifications," The Institute of Electrical and Electronics Engineers, Inc., 379 pages (Mar. 8, 2002).

EEE Std 802.3-2005, "IEEE Standard for Information technology—Telecommunications and information exchange between systems—Local and metropolitan area networks—Specific requirements, Part 3: Carrier sense multiple access with collision detection (CSMA/CD) access method and physical layer specifications," The Institute of Electrical and Electronics Engineers, Inc., Sections 1-5, 2695 pages (Dec. 9, 2005).

IEEE Draft P802.3ae/D5.0 Supplement to Carrier Sense Multiple Access with Collision Detection (CSMA/CD) Access Method & Physical Layer Specifications—Media Access Control (MAC) Parameters, Physical Layer, and Management Parameters for 10 Gb/s Operation The Institute of Electrical and Electronics Engineers, Inc., 540 pages (May 1, 2002).

Chen, "Home Network Basis: Transmission Environments and Wired/Wireless Protocols," Prentice Hall, 26 pages (2006).

IEEE Std 802.1Qau, Amendment to IEEE Std 802 1Q-2005 "Virtual Bridged Local Area Networks—Amendment 13: Congestion Notification" The Institute of Electrical and Electronics Engineers, Inc., 135 pages, Apr. 2010.

IEEE Std 802.3-2005 (revision), "IEEE Standard for Information technology—Telecommunications and information exchange between systems—Local and metropolitan area networks—Specific requirements, Part 3: Carrier Sense Multiple Access with Collision Detection (CSMA/CD) access method and physical layer specifications," The Institute of Electrical and Electronics Engineers, Inc., 417 pages (2005).

IEEE Std 802.1BR-2012 "IEEE Standard for Local and metropolitan area networks—Virtual Bridged Local Area Networks—Bridge Port Extension," The Institute of Electrical and Electronics Engineers, Inc., 135 pages (May 14, 2012).

Invitation to Pay Fees and Partial International Search Report in International Application No. PCT/IB2017/052951 dated Oct. 9, 2017 (11 pages).

International Search Report and Written Opinion in International Patent Application No. PCT/IB2017/052951, dated Dec. 1, 2017 (16 pages).

* cited by examiner

TRAFFIC MANAGEMENT IN A NETWORK SWITCHING SYSTEM WITH REMOTE PHYSICAL PORTS

CROSS-REFERENCES TO RELATED APPLICATIONS

This disclosure claims the benefit of U.S. Provisional Patent Application No. 62/338,348, entitled "Inband Channelized Flow Control over Ethernet Links," filed on May 18, 2016, which is hereby incorporated by reference herein in its entirety.

FIELD OF TECHNOLOGY

The present disclosure relates generally to network devices such as network switches, bridges, routers, etc., and more particularly, to managing traffic in network devices.

BACKGROUND

Network devices often employ various flow control mechanisms, for example to reduce or eliminate loss of data units, such as packets, due to congestion at the network devices. Some networking applications require processing and forwarding a high number of data units, such as packets, communication frames, etc. The amount of packet traffic that a network device can handle is limited, in part, by the number of front panel ports, i.e., physical ports via which the network device is connected to other devices or networks. In some such networking application, cascading of network devices is used to increase a number of front ports available to a centralized network device. In such networking applications, it is important to efficiently control flow of packets between the centralized network device and the cascaded network devices.

SUMMARY

In an embodiment, a port extender device comprises: a plurality of front ports configured to interface with a network; at least one uplink port for interfacing with a central switch device; a forwarding processor configured to forward packets, received via ones of the front ports, to a central switch device for processing of the packet by the central switch device; a plurality of egress queues for queueing packets processed by the central switch device and to be transmitted via the front ports of the port extender device, respective egress queues, among the plurality of egress queues, having a queue depth that is less than a queue depth of corresponding respective egress queues in the central switching device; and a flow control processor configured to selectively generate a flow control message indicative of congestion in a particular egress queue among the plurality of egress queues of the port extender device; and cause the flow control message to be transmitted to the central switch device to control transmission of packets from the central switching device to the particular egress queue of the port extender device.

In another embodiment, a method for controlling transmission of packets to a port extender device includes: receiving, at the port extender device from a central switching device, packets that are processed by the central switching device, the packets being for transmission via ones of front ports disposed in the port extender device; queueing, in the port extender device, the packets received from the central switching device in ones of a plurality of egress queues of the port extender device, respective one or more egress queues corresponding to respective front ports of the port extender device, respective egress queues among the plurality of egress queues having a queue depth that is less than a queue depth of corresponding respective egress queues in the central switching device; selectively generating a flow control message indicative of congestion in a particular egress queue of the plurality of egress queues of the port extender device; and causing the flow control message to be transmitted to the central switch device to control transmission of packets form the central switching device to the particular egress queue of the port extender device.

In yet another embodiment, a central switching device comprises: at least one port configured to interface with a port extender device, the port extender device comprising a plurality of front ports for interfacing with a network; a packet processor configured to process packets received from the at least one port extender device, the packets having been received by the at least one port extender device via ones of the plurality of front ports of the at least one port extender device; a plurality of egress queues for storing processed packets to be forwarded to the at least one port extender device for transmission of the processed packets via ones of the plurality of front ports of the at least one port extender device, respective ones of the egress queue having a queue depth that is greater than a queue depth of corresponding respective egress queues disposed in the port extender device; and a flow control processor configured to, responsively to a flow control message received from the port extender device, control transmission of packets to the port extender device from a particular one of the egress queues of the central switch device to prevent overflow of an egress queue of the port extender device corresponding to the particular one of the egress queues of the central switching device.

In still another embodiment, a method for controlling transmission of packets from a central switching device includes: receiving, by the central switch device from at least one port extender device coupled to the central switching device, packets received by the at least one port extender device via ones of a plurality of front ports of the at least one port extender device; processing, by a packet processor of the central switching device, the packets received from the at least one port extender device; queueing, by the packet processor, the processed packets in a plurality of egress queues of the central switching device, the egress queues of egress queues of the central switching corresponding to egress queues of the at least one port extender device, respective ones of the egress queue of the central switching device having a queue depth that is greater than a queue depth of corresponding respective egress queues of the at least one port extender device; and controlling, by a flow control processor of the central switching device responsively to a flow control message received from a port extender device of the at least one port extender devices, transmission of packets from a particular one of the egress queues of the central switch device to prevent overflow of a corresponding egress queue in the port extender device.

In yet another embodiment, a port extender device comprises: a plurality of front ports for interfacing with a network; at least one uplink port for interfacing with a central switch device; a forwarding processor configured to forward packets, received via ones of the front ports, to a central switch device for processing of the packet by the central switch device; and a flow control processor configured to receive a first flow control message from the central switching device, the first flow control message indicating congestion in a particular virtual channel of a plurality of virtual channels between the central switching device and the port extender device, the first flow control message corresponding to a first flow control protocol that supports a first number of channels, generate, based on the first flow control message, a second flow control message conforming to a second flow control protocol, the second flow control protocol supporting a second number of channels smaller than the first number of channels, and transmit the second flow control message via one or more front ports of the plurality of front ports to control transmission of packets, corresponding to the particular virtual channel, to the port extender device.

In still another embodiment, a method of flow control includes: receiving, by a flow control engine of a port extender device, a first flow control message from a central switching device, the first flow control message indicating congestion in a particular virtual channel of a plurality of virtual channels between the central switching device and the port extender device, the first flow control message corresponding to a first flow control protocol that supports a first number of channels; generating, by the flow control engine, based on the first flow control message, a second flow control message conforming to a second flow control protocol, the second flow control protocol supporting a second number of channels smaller than the first number of channels; and causing, by the flow control engine, the second flow control message to be transmitted via one or more front port of the plurality of front ports to control transmission of packets, corresponding to the particular virtual channel, to the port extender device.

In still another embodiment, a switching system comprises: one or more port extender devices, respective port extender devices comprising a plurality of front ports interfacing to a computer network, and a plurality of first queues, respective subsets of the plurality of first queues corresponding to respective front ports of the plurality of front ports; and a switching device coupled to the at least one port extender device and configured to process packets received via ones of the front ports of the port extender device at least to determine other ones of the front ports of a first port extender device, or ones of front ports of a second port extender device, via which to transmit the packets, the switching device comprising a plurality of second queues, respective second queues of the switching device corresponding to respective first queues of the port extender device, wherein a buffer depth of the second queues at the switching device is greater than a buffer of corresponding first queues at the port extender device; and a flow control processor configured to selectively control a transmission of packets from ones of the second queues of the switching device to corresponding ones of the first queues of the one or more port extender devices to prevent an overflow of packets at the corresponding first queues of the port extender device.

DETAILED DESCRIPTION

Figure 1:
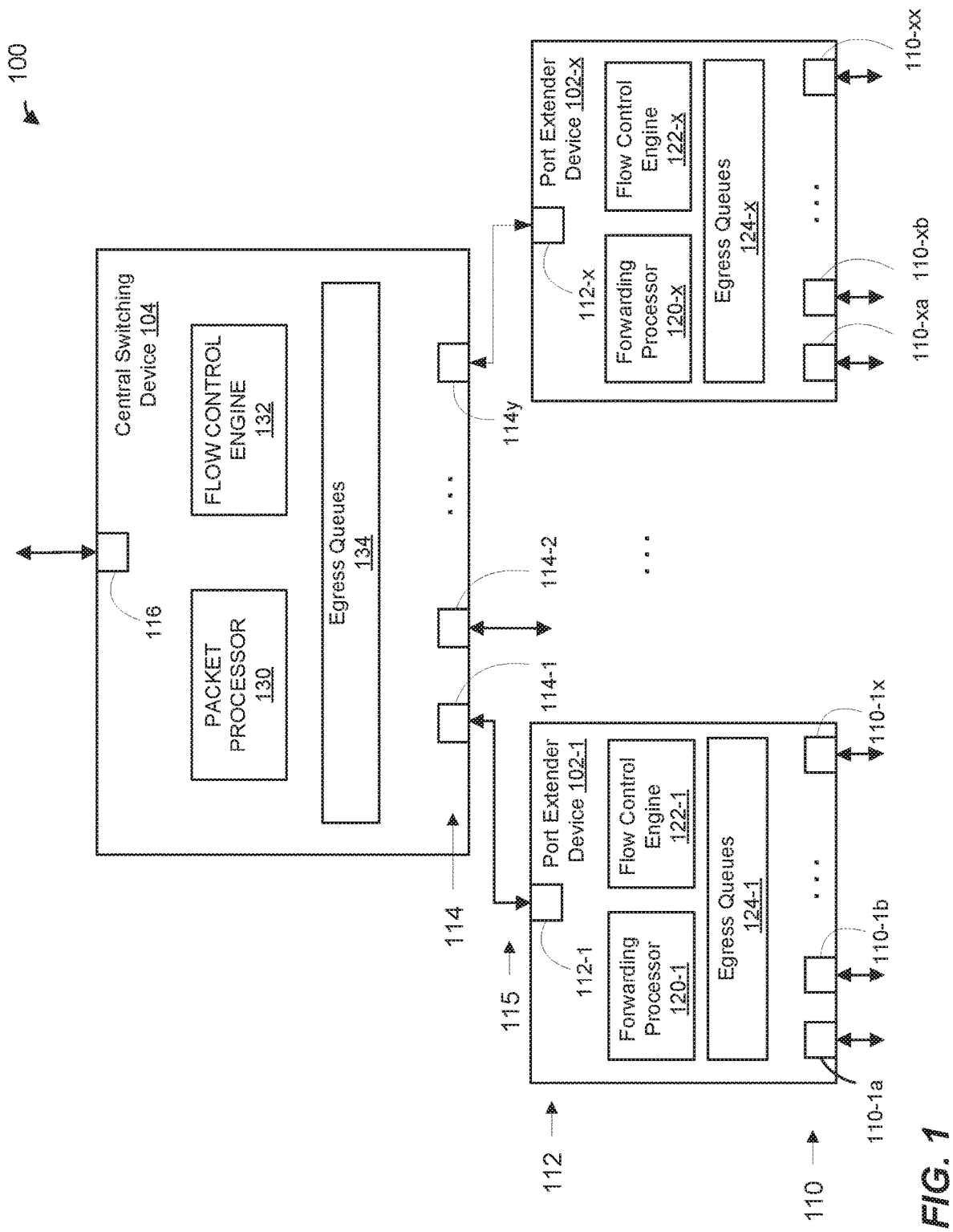
FIG. 1 is a block diagram of an example switching system that includes one or more port extender devices and a central switching device, according to an embodiment.

Embodiments are described herein in the context of flow control in a switching system that includes centralized switching device and port extender devices. It is noted however, in light of the disclosure and teachings herein, that similar methods and apparatus for flow control can be employed in other suitable and devices configured to operate in a computer network. As just an example, channelized flow control over a standard Ethernet link is described below in the context of channelized flow control over a standard. Ethernet link between a centralized switching device and a port extender device. However, similar methods and apparatus for channelized flow control over a standard Ethernet link can be employed in other general network architectures. In general, the described flow control methodologies are not limited to use for flow control between centralized switching devices and port extender devices, but rather may be utilized in other suitable network architectures as well.

In various embodiments described herein, a network switching system includes one or more port extender devices coupled to ports of one or more central switching devices. The one or more port extender devices include front physical ports configured to interface with a computer network, in an embodiment. In an embodiment, a port extender device that includes a plurality of physical front ports is coupled to the central switching device via a number of downlink physical ports of the central switching device that is less than the number of physical front ports of the port extender device. As just an example, a port extender device that includes eight physical front ports is coupled to a central switching device via only one or two downlink physical ports of the central switching device, thereby extending a number of physical front ports available to the central switching device to interface with a computer network, in an embodiment. The one or more port extender devices are relatively passive low cost devices having reduced packet processing and egress buffering capabilities, compared to the central switching device, in an embodiment. For example, the one or more port extender devices generally pass packets received via physical front ports of the port extender devices to the central switching device without processing of the packet, or with minimal processing of the packets, by the port extender device. The central switching device processes packets received from the one or more port extender devices at least to make forwarding decisions for the packets received from the one or more port extender devices to determine one or more physical front ports of the one or more port extender devices via which the packet is to be transmitted. In an embodiment, the central switching device determines a downlink port of the central switching device via which the packet is to be transmitted so that the packet is forwarded to a particular port extender device, and also determines a physical front port or physical front ports of the particular port extender device via which the packet is to be transmitted. In some embodiments, the processing of a packet by the central switching device also includes performing other processing operations such as determining a flow to which the packet corresponds, determining a priority of the flow to which the packet corresponds, determining whether the packet is a unicast packet or a multicast packet, performing packet replication if the packet is a multicast packet, determining whether the packet should be dropped, determining whether the packet should be mirrored for further analysis, etc. In an embodiment, upon completion of processing of a packet by the central switching device, the central switching device provides the processed packet to one or more port extender devices that include the one or more physical front ports via which the packet is to be transmitted, for subsequent transmission of the packet via the one or more determined physical front ports.

In an embodiment, each of the one or more port extender devices maintains egress queues for queuing packets that the port extender device receives from the central switching device for subsequent transmission of the packets from the port extender device. In an embodiment, each of the one or more port extender devices maintains a respective set of egress queues for each front port of the port extender device, with respective egress queues in the set of egress queues corresponding to respective priorities (e.g., supported by the port extender device. In an embodiment, to efficiently manage flow of packets from the central switching device to the one or more port extender devices, the central switching device maintains egress queues to queue processed packets that are destined to the one or more port extender devices but are not yet scheduled to be dequeued from the egress queues and forwarded to ones of the one or more port extender devices, or cannot be immediately forwarded to the ones of the one or more port extender devices for example due to congestion in egress queues in the one or more port extender devices. In an embodiment, the central switching device maintains a number of egress queues that corresponds to the number of egress queues in the one or more port extender devices. Thus, in an embodiment, the number of egress queues maintained by the central switching device generally exceeds the number of physical downlink ports of the central switching device. Maintaining the large number of egress queues at the central switching device essentially creates a large number of virtual channels for transmission of packets from the central switching device to the one or more port extender devices via a relatively smaller number of downlink ports of the central switching device, in an embodiment.

In an embodiment, respective egress queues in a port extender device have corresponding respective egress queues in the central switching device. In an embodiment, respective egress queues in the central switching device have a queue depth that is significantly deeper than corresponding respective egress queues in the port extender device. The respective egress queues in the central switching device serves as extensions of the corresponding respective queues in a port extender device. Maintaining relatively shallow egress queues in the port extender devices reduces amount of buffer space needed for the egress queues in a port extender device, thereby reducing power consumption and cost of the port extender device and/or increasing a number of physical front ports that can be supported in the port extender device, in at least some embodiments. As such, because, in an embodiment, because egress queueing is handled mainly by the deeper egress queues of the central switching device and the port extender devices are provided with minimal egress queuing capabilities and reduced cost, addition additional physical front ports to the switching system is accomplished at a low cost by addition of one or more low cost port extender devices, in various embodiments.

In an embodiment, the one or more port extender devices and the central switching device implement channelized flow control to mitigate susceptibility of the relatively shallower egress queues in the port extender devices and/or to prevent overflow of the relatively shallow egress queues in the one or more port extender devices. In an embodiment, the channelized flow control allows for individual control of transmission of packets from particular egress queues in the central switching device to the corresponding particular egress queues in the one or more port extender devices. Thus, for example, if a particular egress queue in a port extender device becomes congested, the port extender device indicates to the central switching device the particular egress queue that is congested, and the central switching device controls transmission of packets, for example by pausing transmission of packets or reducing the rate of transmission of packets, from an egress queue in the central switching device that corresponds to the particular egress queue in the port extender device without blocking or otherwise negatively effecting transmission of packets from other egress queues in the central switching device to the port extender device. For example, if an egress queue in the port extender device corresponding to a certain front physical port of the port extender device and a certain priority is experiencing congestion, the port extender device indicates the congested egress queue to the central switching device and the central switching device blocks transmission of packets to the congested egress queue without blocking transmission of packets to other egress queues in the pot extender device corresponding to the same front physical port of the port extender device and other priorities, and without blocking transmission of packets to egress queues corresponding other front physical ports of the port extender device, thereby preventing fate sharing among the egress queues of the port extender device, in an embodiment. For example, because transmission of packets to non-congested egress queues in the port extender device is not negatively affected (e.g., is not blocked) due to congestion in other ones of the egress queues in the port extender device, fate sharing among ones of the egress queues in the port extender device is prevented because non-congested egress queue do not share fate with congested egress queues, in an embodiment. Accordingly, the channelized flow control of packets from the central switching device to the one or more port extender devices, at times of congestion in particular ones of the relatively shallow egress queues in the one or more port extender devices, prevents overflow of the congested egress queues in the one or more port extender device without blocking transmission of packets to non-congested egress queues in the one or more port extender devices and preventing fate sharing between different egress queues in the one or more port extender devices, in at least some embodiments. Moreover, the relatively deeper egress queues in the central switching device reduce or eliminate dropping of packets to be transmitted via the physical front ports of the one or more port extender devices without the need for additional buffer space for queueing the packets at the one or more port extender devices, in an embodiment.

FIG. 1 is a block diagram of an example switching system 100 configured to implement various flow control techniques described herein, according to an embodiment. In an embodiment, the switching system 100 is part of a data center, for example. In another embodiment, the switching system 100 is a node of a computer network. The switching system 100 includes one or more port extender devices 102 coupled to a central switching device 104. Each of the one or more port extender devices 102 includes a set of physical front ports 110 for coupling the port extender devices 102 to networks, network devices on the networks, data center devices such as serves, storage devices, compute devices, etc., for example, in an embodiment. Each of the one or more port extender devices 102 also includes one or more uplink ports 112 for coupling the port extender device 102 to the central switching device 104. The central switching device 104 includes one or more downlink ports 114 and one or more uplink ports 116, in an embodiment. At least some of the downlink ports 114 are coupled to uplink ports 112 of respective port extender devices 102 via respective links 115, in an embodiment. In an embodiment, the respective links 115 conform to a standardized communication protocol. For example, in an embodiment, the respective links 115 are standard Ethernet links. The one or more uplink ports 116 of the central switching device are coupled to other network devices, such as uplink network devices (e.g., core switches) in the data center, for example. In an embodiment, the central switching device 104 is a relatively "active" switching device configured to process packets provided to the central switching device 104 by the port extender devices 102, while the port extender devices 102 are relatively "passive" devices that generally do not perform processing of the packets, or perform minimal processing of the packets, and generally simply transfer packets between the central switching device 104 and the physical front ports 110 of the port extender device. Thus, in an embodiment, the port extender devices 102 merely provide port extension or port fan-out functionality for the downlink ports 114 of the central switching device 104.

With continued reference to FIG. 1, the port extender devices 102 include respective forwarding processors 120, respective flow control engines 122, and respective sets of egress queues 124. In general, a port extender device 102 (e.g., the port extender device 102-1) is configured to receive packets via front ports 110 of the port extender device 102, and provide the packets to the forwarding processor 120 (e.g., the forwarding processor 120-1) of the port extender device 102. In an embodiment, the forwarding processor 120 minimally processes a received packet and forwards the minimally processed packet to the central switching device 104 for further processing of the packet. The minimal processing performed by the forwarding processor 120 includes adding one or more tags to a header of the packet that will allow the central switching device 104 to determine via which one of the front ports 110 of the port extender device 102 the packet was received, for example, in an embodiment.

The port extender device 102 is also configured to receive, via an uplink port 112 of the port extender device 102, packets processed by the central switching device 104. In an embodiment, the port extender device 102 is configured to transmit the packets processed by the central switching device 104 via ones of the ports 110 determined based on processing of the packets by the central switching device 104. In operation, when the port extender device receives a processed packet from the central switching device 104, the forwarding processor 120 of the port extender device 102 places the packet in an egress queue 124 corresponding to a front port 110 via which the packet is to be transmitted. In an embodiment, the egress queues 124 include a plurality of subsets of egress queues 124, respective subsets of egress queues 124 corresponding to respective front ports 110 of the port extender device. In an embodiment, each subset of egress queues 124 includes a plurality of queues 124, with respective egress queues 124 of the subset of egress queues 124 corresponding to respective priorities, such as quality of service (QoS) levels, supported by the port extender device 102. Thus, for example, in an embodiment in which the port extender device supports eight different priorities (e.g., eight different QoS levels), the egress queues 124 include multiple subsets of queues 124 respectively corresponding to the front ports 110, each particular subset of queues 124 having eight queues 124 for queuing packets of different priorities to be transmitted via a particular port 110. In an embodiment, the forwarding processor 120 determines the front port 110 via which the packet to be transmitted and a particular queue 124, corresponding to the front port 110, into which to place the packet, based on one or more tags in a header of the packet. In an embodiment, prior to placing the packet into the determined egress queue 124, the forwarding processor 120 removes the one or more tags from the header of the packet.

In an embodiment, particular egress queues 124 may become congested in some circumstances, for example due to congestion on a link coupled to a port 110 to which a particular egress queue 124 corresponds, or a temporary suspension of transmission of packets from the particular egress queue 124 in response to a flow control message received from a downstream network device coupled to the 110 to which the egress queue 124 corresponds. To mitigate congestion in particular ones of the queues 124 without blocking packets destined to other ones of the egress queues 124, the flow control engine 122 of the port extender device 102 monitors congestion in the egress queues 124 and selectively generates flow control messages to indicate congestion in particular ones of the egress queues 124. The flow control engine 122 causes the flow control messages to be transmitted to the central switching device 104 to control transmission of packets destined to the particular egress queues 124 from the central switching device 104, without negatively effecting transmission of packets to non-congested egress queues 124, in an embodiment.

Turning now to the central switching device 104, in an embodiment, the central switching device 104 includes a packet processor 130, a flow control engine 132 and a plurality of egress queues 134. The packet processor 130 of the central switching device 104 is configured to process packets received from the port extender devices 102 via the ports 114 (or packet descriptors associated with packets received via the ports 114), in an embodiment. In an embodiment, the packet processor 130 is configured to process a packet received from a port extender device 102 at least to make a forwarding decision for the packet to determine one or more front ports 110 of the one or more port extender devices 102 via which the packet is to be transmitted. In an embodiment, the packet processor 130 is coupled to a forwarding database (not shown) that stores forwarding information (e.g., port information) associated with addresses (e.g., media access control (MAC) addresses, Internet Protocol (IP) addresses, etc.) and/or other suitable information. In an embodiment, the packet processor 130 is configured to utilize information from a packet header to look up information. In the forwarding database that indicates one or more front ports 110 to which the packet is to be forwarded. Based on the forwarding decision for the packet, packet processor 130 enqueues the packet in one or more egress queues 134 for subsequent transmission of the packet to one or more port extender devices 102 that include the front ports 110 determined for transmission of the packet from the one or more port extender devices 102.

In an embodiment, the egress queues 134 include respective sets of egress queues 134 corresponding to respective downlink ports 114 of the central switching device 104. Respective sets of egress queues 134 include respective subsets of egress queues 134 corresponding to respective front ports 110 of the port extender device 102 coupled to the corresponding downlink port 114 of the central switching device 104, in an embodiment. In an embodiment, the respective subsets of egress queues 134 include respective egress queues 134 corresponding to respective egress queues 124 of the port extender device 102 coupled to the corresponding downlink port 114 of the central switching device 104. In an embodiment respective egress queues 134 of the port central switching device 104 correspond to respective egress queues 124 of the port extender devices 102. Accordingly, the central switching device generally maintains, for a particular port 114, a number of egress queues 134 that corresponds to the number of physical ports 110 of the port extender device 102 coupled to the particular port 114 multiplied by the number of different packet priorities supported by the switching system 100, in an embodiment. Maintaining the egress queues at the central switching device essentially creates a large number of virtual channels for transmission of packets from the central switching device to the port extender device coupled to a port 114 of the central switching device 104. In an embodiment, a "virtual channel" corresponds to a channel virtually created by corresponding egress queues in a central switching device (e.g., the central switching device 104) and egress queues in a port extender device (e.g., port extender device) coupled to the central switching device. Thus, for example, a virtual channel between the central switching device 104 and a port extender device (e.g., the port extender device 102-1) corresponds to an egress queue 134 in the central switching device and a corresponding egress queue (e.g., a corresponding egress queue 124-1) in the port extender device, in an embodiment.

In an embodiment, packets from the egress queues 134 are generally transferred to the corresponding egress queues 124 of the port extender devices 102. In an embodiment, egress queues 134 of the central switching device have a queue depth that is greater than a queue depth of the corresponding egress queues 124 of the port extender devices. For example, the egress queues 134 are at least 25% deeper than the corresponding egress queues 124, in an embodiment. As another example, the egress queues 134 are 50% deeper, 75% deeper, 90% deeper, etc., than the corresponding egress queues 124, in some embodiments. In other embodiments, the egress queues 134 are deeper that the corresponding queues 124 by other suitable amounts. In an embodiment, channelized flow control between the port extender devices 102 and the central switching device 104 is implemented to prevent overflow in the relatively shallower egress queues 124 of the port extender devices 102 and/or to mitigate congestion in the egress queues 134 of the central switching device 104.

In an embodiment, the flow control engine 132 of the central switching device 104 is configured to receive a flow control message generated by a flow control engine 122 of a port extender device 102, the flow control message indicating congestion in a particular egress queue 124 of the port extender device 102, and responsive to the flow control message, control transmission of packets from a corresponding egress queue 308 of the central switching device 104 to prevent overflow of the particular egress queue 124 in the port extender device 102. In an embodiment, the flow control engine 132 is also configured to detect congestion in particular ones of the egress queues 134 of the central switching device 104, and to generate flow control messages indicating congestion in the particular ones of the egress queues 134 of the central switching device 104. The flow control messages indicating congestion in the particular ones of the egress queues 134 of the central switching device 104 are provided the port extender devices 102 so that flow control can be propagated to downstream network devices coupled to the port extender devices 102, in an embodiment. Propagating flow control to downstream network devices coupled to the port extender devices 102 controls transmission of packets (e.g., packets corresponding to particular priorities) to the port extender devices 103, thereby reducing the number of packets (e.g., packets of particular priorities) to be processed by the central switching device 104 and mitigating congestion in the particular egress queues 134 of the central switching device 104, in an embodiment.

In an embodiment, flow control messages transmitted from the central switching device 104 to a port extender devices 102, and vice versa, are transmitted in-band with transmission of packets from the central switching device 104 to a port extender devices 102, and vice versa, over the same links 115 (e.g., Ethernet links) over which packets are transmitted from the central switching device 104 to a port extender devices 102, and vice versa. In an embodiment, flow control messages transmitted from the central switching device 104 to a port extender devices 102, and vice versa, generally conform to a first flow control protocol for in-band flow control (e.g., flow control over Ethernet links) that supports a relatively large number of virtual channels needed to enable individual flow control of packets from the relatively large number of egress queues 134 of the central switching device 104 to the corresponding egress queues 124 of the port extender devices 102. In an embodiment, the port extender devices 102 additionally support a second flow control protocol for interacting with network devices that are coupled to the ports 110 of the port extender devices 102. In an embodiment, the second flow control protocol is a channelized per-priority flow control protocol that supports a relatively smaller number of virtual channels corresponding to the number of priorities (e.g., QoS levels) supported by the port extender devices 102 and the switching system 100. In an embodiment, the first flow control protocol is a quantized congestion notification (QCN) protocol or another suitable flow control protocol that supports a relatively large number of channels. In an embodiment, the first flow control protocol is IEEE 802.1Qau congestion notification message (CNM) flow control protocol. In another embodiment, the first flow control protocol is another suitable flow control protocol that supports a relatively large number of channels or connections. In an embodiment, the second flow control protocol is a priority flow control (PFC) protocol or another suitable flow control protocol that supports a relatively smaller number of channels. In an embodiment, the second flow control protocol is IEEE 802.3x protocol that defines link-level flow control or the IEEE 802.1Qbb protocol that defined priority-level flow control. In another embodiment, the second flow control protocol is another suitable flow control protocol that supports a relatively smaller number of channels.

In an embodiment, the flow control engine 132 of the central switching device 104 is configured to respond, to a flow control message received from a port extender device 102, in accordance with the second flow control protocol even though the flow control message generally conforms to the first flow control protocol. For example, the second flow control protocol defines a flow control response that is more suitable for channelized flow control of packets from the central switching device 104 to the port extender devices 102 as compared to a flow control response defined by the first flow control protocol. In an embodiment, the response according to the second flow control protocol requires some information that is not included in the flow control message that conforms to the first flow control protocol. In an embodiment, the flow control engine 132 determines the information not included in the flow control message based on the information that is included in the flow control message. As an example, in an embodiment, the first flow control protocol operates by indicating a fill level of a congested queue, and response to the flow control message according to the first flow control protocol involves modulating the rate of flow of packets destined for the congested queue based on the fill level of the congested queue. On the other hand, a response to a flow control message in accordance with the second flow control protocol involves, rather than modulating the rate of flow of packets destined for the congested queue, pausing transmission of packets destined for the congested queue for a certain amount of time. In this embodiment, the flow control engine 132 determines, based on a fill level of a congestion egress queue 124 indicated in a flow control message received from a port extender device 102, an amount of time for which to pause transmission of packets to the congested egress queue 124 of the port extender device 102, and pauses transmission of packets from a corresponding egress queue 134 of the central switching device 104 to the congested egress queue 124 of the port extender device 102 for the determined amount of time.

In an embodiment, a flow control engine 122 of a port extender device 102 is configured to receive, from the central switching device 104, a first flow control message that generally conforms to the first flow control protocol, the flow control message indicating congestion in a particular egress queue 134 of the central switching device 104, and to convert the first flow control message to a second flow control message that generally conforms to the second flow control protocol. The second flow control message is then transmitted via one or more of the front ports 110 to one or more network devices coupled to the one or more front ports 110 to pause transmission of packets, associated with the priority corresponding to the congested egress queue 134, from the one or more network devices to mitigate congestion in the congested egress queue 134. Similarly, in an embodiment, a flow control engine 122 of a port extender device 102 is configured to receive a first flow control message received via a front port 110 of the port extender device 102 from a network device coupled to the front port 110 of the port extender device 102, the first flow control message generally conforming to the second flow control protocol and generally indicating an egress queue 124 from which the port extender device 102 is to pause transmission of packets to the network device coupled to the front port 110 of the port extender device 102. The flow control engine 122 is configured to convert the first flow control message to a second flow control message generally conforming to the first flow control protocol, in an embodiment. The second flow control message is then transmitted from the port extender device 102 to the central switching device 104 to pause transmission of packets destined to the egress queue 124 identified in the first flow control message, in an embodiment.

Figure 2:
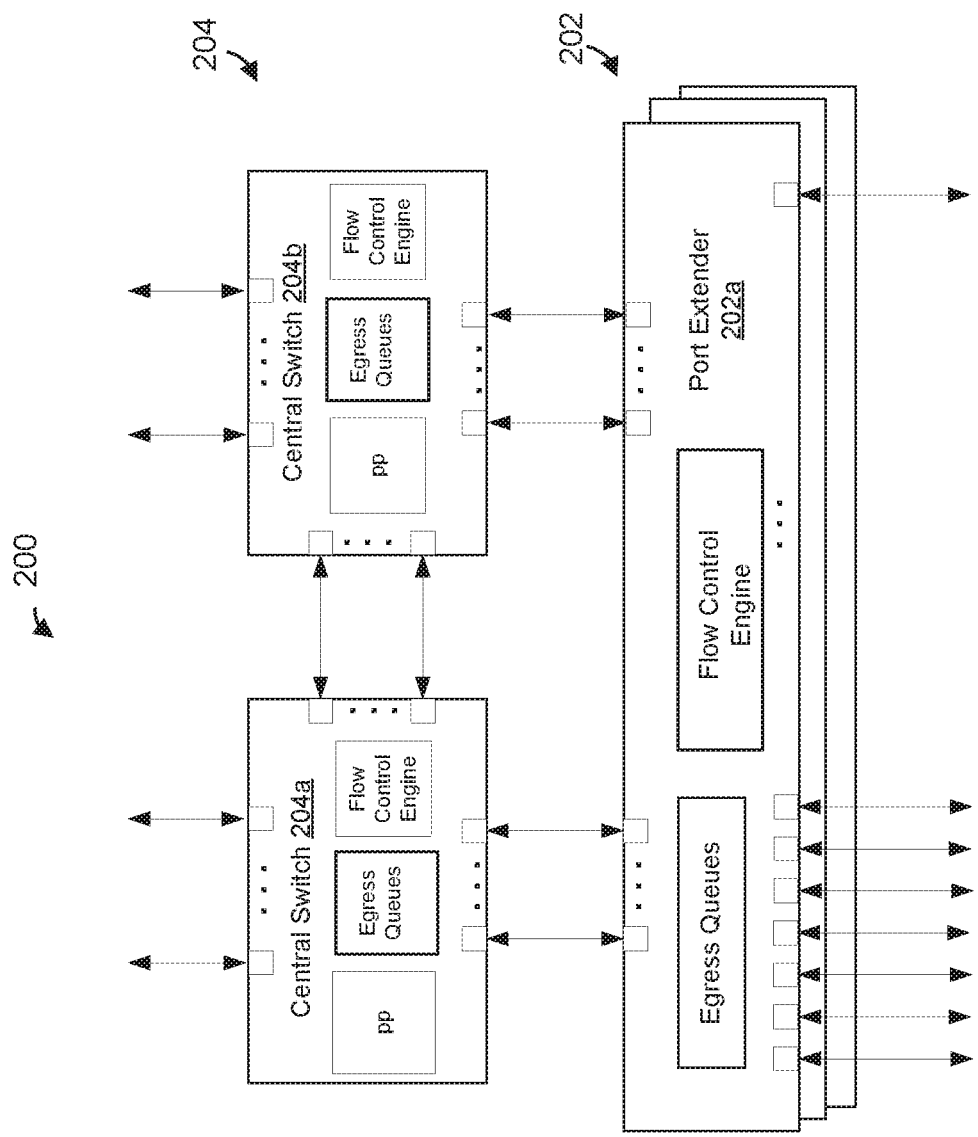
FIG. 2 is a block diagram of an example switching system that includes one or more port extender devices and multiple central switching devices, according to an embodiment.

FIG. 2 is a block diagram of an example switching system 200 that includes one or more port extender devices 202 and multiple central switching devices 204, according to an embodiment. In an embodiment, the port extender devices 202 are the same as or similar to the port extender devices 102 of FIG. 1. Similarly, the central switching devices 204 are the same as or similar to the central switching device 104 of FIG. 1, in an embodiment. In other embodiments, the port extender devices 202 are different from the port extender devices 101 of FIG. 1 and/or the central switching devices 204 are different from the central switching device 104 of FIG. 1.

In an embodiment, each of the one or more port extender devices 202 is coupled to one or more of the multiple central switching devices 204. In this configuration, the multiple central switching devices 204 provide resilience to the switching system 200 and/or improve performance of the switching system 200, in various embodiments. For example, the multiple switching devices 204 provide resilience to the switching system 200 by providing for fail-over capability in which operation is switched over from a central switching device 204 to other one or more central switching devices 204 in case of a failure of the central switching device 204, in an embodiment. As another example, multiple switching devices 204 improve performance by increasing the rate of processing of packets received by the port extender devices 204, in an embodiment.

Figure 3:
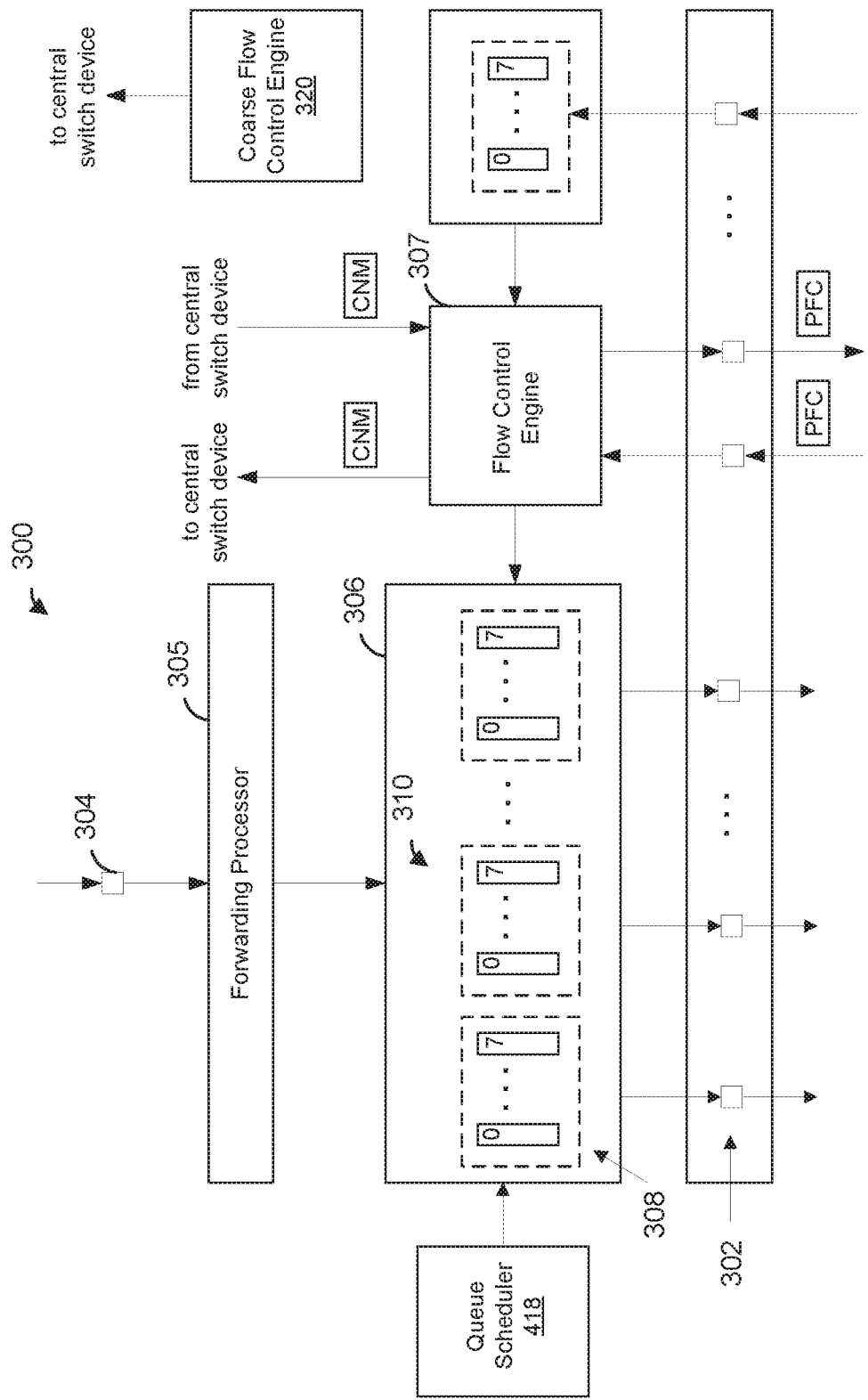
FIG. 3 is a block diagram of a port extender device used with the system of FIG. 1 or the system of FIG. 2, according to an embodiment.

FIG. 3 is a block diagram of a port extender device 300, according to an embodiment. In an embodiment, the port extender device 300 corresponds to a port extender device 102 of FIG. 1 or a port extender device 202 of FIG. 2. The port extender device 300 includes a plurality of front ports 302 for coupling the extender device 302 to networks, network devices such as switches, routers, bridges, etc., endpoints such as servers, storage devices, etc., in a data center, etc. The port extender device 300 also includes an uplink port 304 for coupling the port extender device 300 to a central switching device. The port extender device 300 is configured to receive packets via ones of the front ports 302 and to forward the received packets to a central switching device coupled to the port extender device 300 via the port 304. The port extender device 300 is further configured to receive, via the port 304, packets processed by the central switching device coupled to the port extender device 300, and to forward the packets to appropriate ones of the front ports 302 for transmission of the packets via the front ports 302.

In an embodiment, the port extender device 300 includes a forwarding processor 305, a queue buffer 306 and a flow control engine 307. The queue buffer 306 holds a plurality of egress queues 308 for queuing packets to be transmitted via the front ports 302. In an embodiment, the egress queues 308 include a plurality of sets 310 of egress queues 308, respective sets 310 of egress queues 308 corresponding to respective front ports 302, in an embodiment. Each set 310 of egress queues 308 includes a plurality of egress queues 308 respectively corresponding to different priorities supported by the port extender device 300. In the example embodiment of FIG. 3, the port extender device 300 supports up to eight different priorities, and each set 310 of egress queues 308 includes up to eight egress queues 308 respectively corresponding to ones of the eight packet priorities. In operation, when the port extender device 300 receives a packet from a central switching device, the forwarding processor 305 of the port extender device 300 determines, based on a header of the packet, a particular port 302 to which the packet is to be forwarded and a particular egress queue 308, of a set 310 of egress queues 308 corresponding to the particular port 302, in which to place the packet. The packet is then placed in the egress queue 308 for subsequent transmission of the packet via the port 302, in an embodiment.

In an embodiment, the port extender device 300 includes a queue scheduler 309 configured to schedule transmission of packets from the egress queues 308. The queue scheduler 309 services the egress queues 308, corresponding to a particular front port 302 of the port extender device 300 according to a suitable arbitration scheme, in various embodiments. In some embodiments, the port extender device 300 omits the queue scheduler 309, and instead relies on scheduling implemented by a central switch device to which the port extender device 300 is coupled.

The flow control engine 307 manages traffic in the port extender device 300 to prevent overflow in the egress queues 308, in an embodiment. Congestion in the egress queues 308 results, for example, when the rate at which packets are received by the port extender device 300 is higher than the rate at which the packets can be transmitted from the port extender device 300, in an embodiment. As another example, congestion in an egress queue 308 corresponding to a port 302 occurs when the port extender device 300 pauses transmission of packets from the egress queue 308 in response to a flow control message that the port extender device 300 receives from a downstream device coupled to the port 302, in an embodiment. In an embodiment, the flow control engine 307 implements channelized flow control to control transmission of packets from a central switching device coupled to the port extender device 300 destined to particular ones of the egress queues 308 of the port extender device 300. The channelized flow control implemented by the flow control engine 307 prevents fate sharing between egress queues 308 in the port extender device 300, or blocking transmission of packets directed to non-congested queues 308 due to congestion in other ones of the queues 308, in at least some embodiments.

In an embodiment, to implement channelized flow control, the flow control engine 307 generally operates according to a first flow control protocol that supports a relatively large number of virtual channels between the port extender device 300 and the central switching device to which the port extender device 300 is coupled. In an embodiment, the first flow control protocol supports a greater number of channels than the number of ports 302 of the port extended device 300 and/or the number of priorities supported by the port extender device 300. In an embodiment, the first flow control protocol corresponds to a standardized flow control protocol, such as the IEEE 802.1Qau congestion notification message (CNM) flow control protocol, that supports a greater number of channels than the number of ports 302 of the port extended device 300 and/or the number of priorities supported by the port extender device 300. In another embodiment, the first flow control protocol does not correspond to a standardized flow control protocol.

In operation, the flow control engine 307 detects congestion in the egress queues 308, and generates congestion notification messages that indicate detected congestion in the egress queues 308, in an embodiment. In an embodiment, the flow control engine 307 is configured to detect level of an egress queue 308 each time a packet is enqueued in the egress queue 308, and to generate congestion notification messages based on the measurement of the level of the egress queue 308. For example, in an embodiment, the flow control engine 307 generates a congestion notification message if the measured level of the queue exceeds a predetermined threshold. In another embodiment, a probability with which the flow control processor generates a congestion notification message depends on (e.g., is proportional to) the measured fill level of the queue. In an embodiment, a congestion notification message generated by the flow control engine 307 includes information that identified the particular egress queue 308 for which the congestion notification message is generated. For example, the congestion notification message includes a tag, such as a distributed switching architecture (DSA) tag, that identifies the port 302 to which the egress queue 308 corresponds, and a queue identifier that identifies the priority level to which the queue 308 corresponds. In this embodiment, the DSA tag identifies the set 310 of which the particular egress queue 308 is a part, and the queue identifier identifies the priority and, accordingly, the particular egress queue 308 within the identified set 310.

The congestion notification message generated by the flow control engine 307 is transmitted via the port 304 to the central switching device coupled to the port 304, in an embodiment. In an embodiment in which the port extender device 300 is coupled to multiple central switching devices, such as in the switching system of FIG. 2, the congestion notification message generated by the flow control engine 307 is transmitted to the particular one of the multiple central switching devices that transmitted the packet based on which the congestion notification message was generated by the flow control engine 307. In another embodiment in which the port extender device 300 is coupled to multiple central switching devices, the congestion notification message generated by the flow control engine 310 is transmitted to each of the multiple central switching devices. In an embodiment, a central switching device that receives a congestion notification message from the port extender device 300 identifies, based on information in the congestion notification message, an egress queue 308 to which the congestion notification message corresponds, and pauses transmission of packets from an egress queue, in the central switching device, corresponding the identified egress queue 308 of the port extender device 300.

In an embodiment, the port extender device 300 also includes a coarse flow control engine 320. The coarse flow control engine 320 is configured to generate a block flow control message and to transmit the block flow control message to a central switching device to temporally block transmission of all packets to the port extender device 300, or transmission of all packets corresponding to certain priorities to the port extender device 300. In an embodiment, the coarse flow control engine 320 monitors overall buffer space collectively available for egress queues 308, and triggers the flow control message when the overall buffer space collectively available for egress queues 308 is nearly used up by the egress queues 308.

Figure 4:
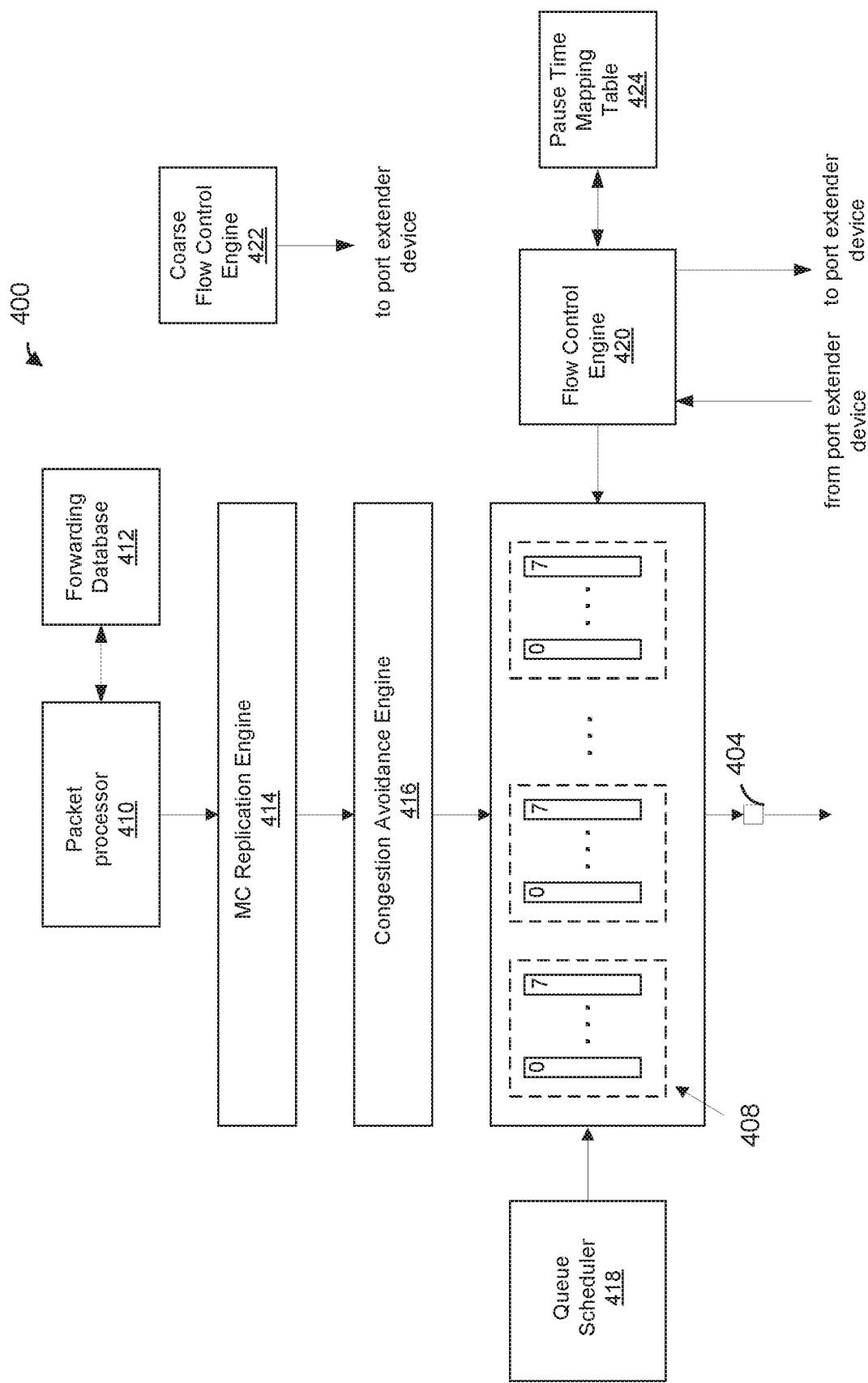
FIG. 4 is a block diagram of a central switching device used with the system of FIG. 1 or the system of FIG. 2, according to an embodiment.

FIG. 4 is a block diagram of a central switching device 400, according to an embodiment. In an embodiment, the central switching device 400 corresponds to the central switching device 104 of FIG. 1 or each central switching device 204 of FIG. 2. The central switching device 400 is configured to be coupled to at least one port extender device, such as the port extender device 300 of FIG. 3, in an embodiment. The central switching device 400 includes a set of egress queues 408 corresponding to a downlink port 404 of the central switching device 400. Respective egress queues 408 correspond to respective egress queues of a port extender device coupled to the downlink port 404 of the central switching device, in an embodiment. For example, in an embodiment, the port extender device 300 of FIG. 3 is coupled to the downlink port 404 of the central switching device 400, and respective egress queues 408 correspond to respective egress queues 308 of the port extender device 300 of FIG. 3. Although only one set of egress queues 408 and only one downlink port 404 are illustrated in FIG. 4, the central switching device 400 typically includes multiple sets of egress queues 408 and multiple downlink ports 404, in some embodiments.

In an embodiment, the central switching device 400 includes a packet processor 410 coupled to a forwarding database 412, a multicast packet replication engine 414, a congestion avoidance engine 416, a queue scheduler 418, a flow control engine 420, and a coarse flow control engine 422. Although the multicast packet replication engine 414, the congestion avoidance engine 416, the queue scheduler 418, the flow control engine 420, and the global flow control engine 422 are illustrated in FIG. 4 as being separate from the packet processor 410, at least some of these engines are included in the packet processor 410, in some embodiments. For example, the multicast packet replication engine 414 and the congestion avoidance engine 416 are included in the packet processor 410, in an embodiment.

The packet processor 410 is configured to process packets received by the central switching device from at least one port extender device coupled to the central switching device 400, in an embodiment. Processing of a packet by the packet processor 410, in an embodiment, includes at least determining one or more front ports, of the at least one port extender device, to which to forward the packet. In an embodiment, processing of the packet by the packet processor 410 also includes determining a flow to which the packet corresponds, determining a priority of the flow to which the packet corresponds, determining whether the packet is a unicast packet or a multicast packet, performing packet replication if the packet is a multicast packet, determining whether the packet should be dropped, determining whether the packet should be mirrored for further analysis, etc. In various embodiments, the central switching device 400 utilizes virtual ports and/or extended ports (e-ports) to facilitate processing of packets received via physical front ports of the least one port extender device coupled to the central switching device 400. For example, the central switching device 400 assigns virtual ports and/or e-ports to packets to identify physical front ports of the at least one port extender device via which the packets are received and/or via which the packets are to be transmitted, and processing the packets using the assigned virtual ports and/or e-ports. Various techniques used by the central switching device 400, in some embodiments, for processing packets received via front physical ports of the at least one extender device are described in U.S. patent application Ser. No. 13/151,927, entitled "Centralized Packet Processor for a Network," filed on Jun. 2, 2011, now U.S. Pat. No. 8,804,733 and in U.S. patent application Ser. No. 13/151,948, entitled "Interface Mapping in a Centralized Packet Processor for a Network," filed on Jun. 2, 2011, now U.S. Pat. No. 9,042,405, both of which are hereby incorporated by reference herein, in their entireties.

Packets processed by the packet processor 410 are placed in egress queues 408. In an embodiment, the packet processor 410 determines a particular egress queue, or particular egress queues, in which to place a packet based on the determination of the one or more front ports 110 to which the packet is to be forwarded and the priority of the flow to which the packet corresponds, in an embodiment. The multicast packet replication engine 414 replicates multicast packets to generate respective copies of the multicast packets for transmission via respective front ports of the at least one port extender device, in an embodiment. The congestion avoidance engine 416 implements a suitable congestion avoidance technique (e.g., tail drop) to prevent overflow in the egress queues 408, in an embodiment. For example, the congestion avoidance engine 416 detects fill level of the egress queues 408 and, when a fill level of an egress queue 408 is nearing a maximum fill level for the egress queue 408, the congestion avoidance engine 416 drops one or more packets destined to the egress queue 408 to prevent overflow in the egress queue 408, in an embodiment.

The queue scheduler 418 is configured to schedule transmission of packets from the egress queues 408, in an embodiment. The queue scheduler 418 services the egress queues 408, corresponding to a particular front of the port extender device coupled to the port 404, in a strict priority and/or in a weighted round robin (WRR) priority and/or in shaped deficit weighted round robin (SDWRR), in various embodiments. The flow control engine 420 is configured to receive flow control messages provided by the at least one port extender device coupled to the central switching device 100, and in response to the flow control message control transmission of packets from particular egress queues 408 to prevent overflow of corresponding egress queues in the at least one port extender device, in an embodiment. In an embodiment, when the flow control engine 420 receive a flow control message provided by a port extender device, the flow control message determines, based on information included in the flow control message, to which channel and, accordingly, to which particular egress queue 408 the flow control message corresponds. For example, the flow control engine 420 determines the channel based on (ii) information indicative of a physical front port of the port extender device and (ii) information indicative of a priority of the congested egress queue corresponding to the physical front port in the port extender device included in the flow control message. In an embodiment, the flow control engine 420 determines the channel based on a QCN congestion point identifier (CND) and a DSA tag included in the flow control message. In another embodiment, the flow control message includes other suitable information, such as standard Ethernet packet information that signals a channel to which the flow control message corresponds, and the flow control engine 420 determines the channel additionally or alternatively based on the other suitable information. For example, in an embodiment, the flow control message includes an Ethernet packet virtual local area network (VAIN) identifier (VID), and the flow control engine 420 determines the channel based at least in part on the VID. As another example, the flow control engine 420 includes an E-tag as defined by the IEEE 802.1BR protocol, and the flow control engine 420 determines the channel based at least in part on the E-tag.

Further, in an embodiment, the flow control engine 420 determines, based on a queue fill level indication included the flow control message, an amount of time for which to pause transmission of packets from the particular egress queue 408. In another embodiment, the flow control message indicates a queue congestion level, rather than a queue fill level, of the congested queue, and the flow control engine 420 determines pause time based on the queue congestion level indicated in the flow control message. For example, in an embodiment, the flow control message includes a quantized feedback (qFb) value determined as defined in the IEEE 802.1Qau protocol, and the flow control engine 420 determines pause time based on the qFb value included in the flow control message. In an embodiment, to determine pause time, the flow control engine 420 access a pause time mapping table 424 to map a queue fill level value, or a queue congestion level, indicated in the flow control message to a pause time value that indicates an amount of time for which to pause transmission of packets from the particular egress queue 408. The flow control engine 420 causes transmission of packets from the particular queue 408 for the determined amount of time, in an embodiment.

The flow control engine 420 is also configured to monitor fill levels of the egress queues 408, and to selectively generate flow control messages indicating particular egress queues 408 that are nearing overflow, in an embodiment. The flow control engine 420 is configured to cause a flow control message corresponding to a particular egress queue 408 to be transmitted to the at least one port extender device so that flow control can be propagated to one or more network devices downstream from the at least one port extender device. In an embodiment, the flow control engine 420 generates a flow control message that indicates a particular physical front port, in a particular port extender device, to which the congested egress queue 408 corresponds, and cause the flow control message to be transmitted to the particular port extender device. The indicated physical front port is the source port of the packet based on which the flow control message was triggered, in an embodiment. The particular port extender device receives the flow control message and propagates flow control via the physical front port indicated in the flow control message, to a downstream device coupled to the physical front port indicated in the flow control message, in an embodiment. Propagation of the flow control to the downstream network devices instructs the downstream network device to pause transmission of packets (or packets corresponding to certain priorities) to the at least one port extender device, enabling lossless transmission of packets, in at least some embodiments.

In an embodiment, the coarse flow control engine 422 of the central switching device 400 operates similarly to the global flow control 320 of the port extender device 300 as described above with reference to FIG. 3. The coarse flow control engine 422 is configured to generate a block flow control message and to transmit the block flow control message to a port extender device to temporally block transmission of all packets from the port extender device, or transmission of packets corresponding to certain priorities from port extender device 300. In an embodiment, the port extender device propagates flow control to one or more network devices downstream from the at least one port extender device temporally block transmission, from the one or more downstream network devices, of all packets to the at least one port extender device, or transmission of all packets corresponding to certain priorities to the at least one port extender device. In an embodiment, the global flow control engine 422 monitors overall buffer space collectively available for egress queues 408, and triggers the flow control message when the overall buffer space collectively available for egress queues 408 is nearly used up by the egress queues 408.

Figure 5:
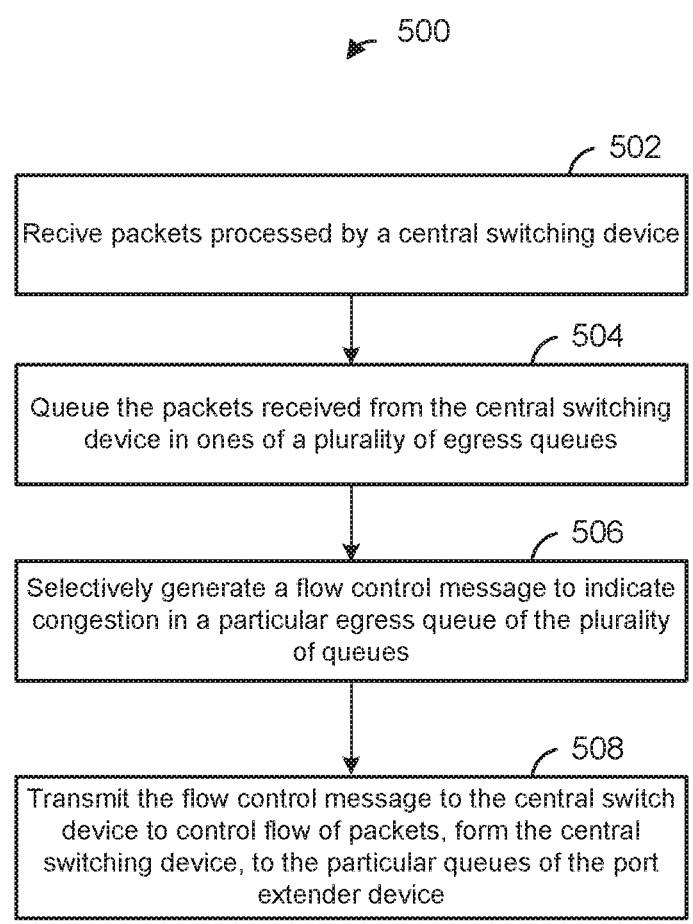
FIG. 5 is a flow diagram of an example method for controlling transmission of packets transmitted to a port extender device, according to an embodiment.

FIG. 5 is a flow diagram of an example method 500 for controlling transmission of packets transmitted to a port extender device, according to an embodiment. In an embodiment, the method 500 is implemented by a port extender device. For example, each of one or more of the port extender devices 102 of FIG. 1 is configured to implement the method 500, in an embodiment. As another example, each of one or more of the port extender devices 202 of FIG. 2 is configured to implement the method 500. In another embodiment, the method 500 is implemented by a port extender device different from the port extender devices 102 of FIG. 1 and the port extender devices 202 of FIG. 2. Similarly, a port extender device 102 of FIG. 1 or a port extender device 202 of FIG. 2 implements a method different from the method 500 to control transmission of packets to egress queue of the port extender device, in some embodiments. It is noted that while the method 500 is described herein in the context of controlling transmission of packets transmitted to a port extender device, the method 500 is used for flow control generally by network devices (e.g., switches, routers, etc.) other than a port extender device and in general network architectures other than a switching system that includes central switching device(s) and port extender device(s), in some embodiments.

At block 502, the port extender device receives packets processed by a central switching device. At block 504, the port extender device enqueues the packets received at block 502 in egress queues of the port extender device. In an embodiment, the port extender device determines, based on information (e.g., one or more tags) included in a header of a packet, a particular front port of the port extender device via which the packet is to be transmitted from the port extender device and/or an egress queue into which the packet is to be placed for subsequent transmission via the particular front of the port extender device.

At block 506, a flow control message is generated. In an embodiment, the flow control message generated a block 506 indicates congestion in a particular egress queue of the port extender device. In an embodiment, the flow control message generated at block 506 includes information that identifies the particular congested egress queue in the port extender device.

At block 508, the flow control message generated a block 506 is transmitted to the central switching device to control transmission of packets from the central switching device destined to the particular egress queue in the port extender device. In an embodiment, the flow control message generated at block 506 is transmitted to the central switching device to instruct the central switching device to pause transmission of packets destined to the particular egress queue in the port extender device.

Figure 6:
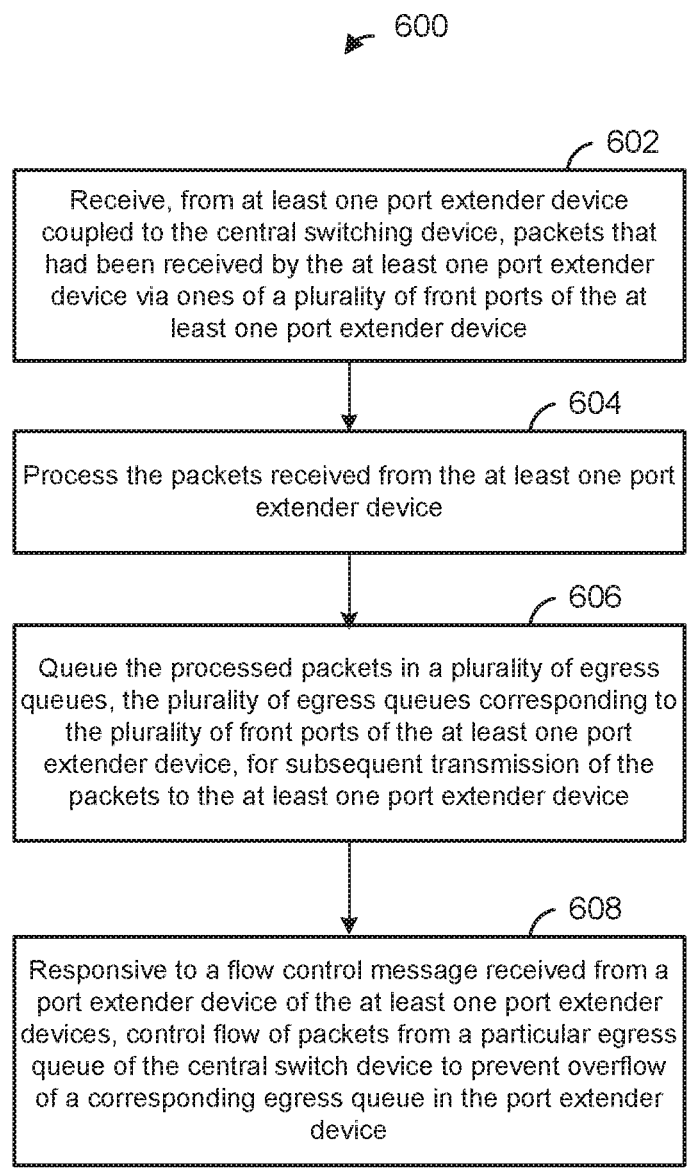
FIG. 6 is a flow diagram of an example method for controlling transmission of packets transmitted from a central switching device, according to an embodiment.

FIG. 6 is a flow diagram of an example method 600 for controlling transmission of packets destined to egress queues of a port extender device, according to an embodiment. In an embodiment, the method 600 is implemented by a central switching device. For example, the central switching device 104 of FIG. 1 is configured to implement the method 600 to control transmission of packets destined to egress queues of the port extender devices 102. As another example, each of central switching devices 204 of FIG. 2 is configured to implement the method 600 to control transmission of packets destined to egress queues of the port extender devices 202. In another embodiment, the method 600 is implemented by a central switching device different from the central switching device 104 of FIG. 1 or a central switching device 204 of FIG. 2 to control transmission of packets destined to egress queues of a port extender device. Similarly, the central switching device 104 of FIG. 1 or a central switching device 204 of FIG. 2 implements a method different from the method 600 to control transmission of packets destined to egress queues of a port extender device, in some embodiments.

At block 602, the central switching device receives packets from at least one port extender device. In an embodiment, the packets received at block 602 had been received by the at least one port extender device via ones of a plurality of front ports of the at least one port extender device.

At block 604, the packets received by the central switching device at block 602 are processed. Processing a packet at block 604 includes determining one or more front ports, of the at least one port extender device, to which to forward the packet.

At block 606, the packets processed at block 604 are enqueued in egress queues of the central switching device. In an embodiment, the egress queues of the central switching device correspond to egress queues in at least one port extender device associated with front ports of the at least one port extender device. In an embodiment, the egress queues of the central switching device correspond to front ports of the at least one port extender device and priorities supported by the front ports of the port extender device. In an embodiment, the egress queues of the central switching device correspond to egress queues in the at least one port extender device. The egress queues in the at least one port extender device are associated with front ports of the at least one port extender device, in an embodiment.

At block 608, responsive to a flow control message received from a port extender device, the central switching device controls transmission of packets from an egress queue of the central switching device to prevent overflow of a corresponding queue in the port extender device. For example, in an embodiment, responsive to the flow control message received from the port extender device, the central switching device pauses transmission of packets from a particular egress queue of the central switching device to prevent overflow of a corresponding egress queue in the port extender device. For example, a flow control engine, such as the flow control engine 420 of FIG. 4, of the central switching device pauses transmission of packets from a particular egress queue of the central switching device to prevent overflow of a corresponding egress queue in the port extender device, in the manner described above with respect to FIG. 4, in an embodiment. In other embodiment, other suitable flow control engines and/or other suitable pause mechanisms are utilized.

Figure 7:
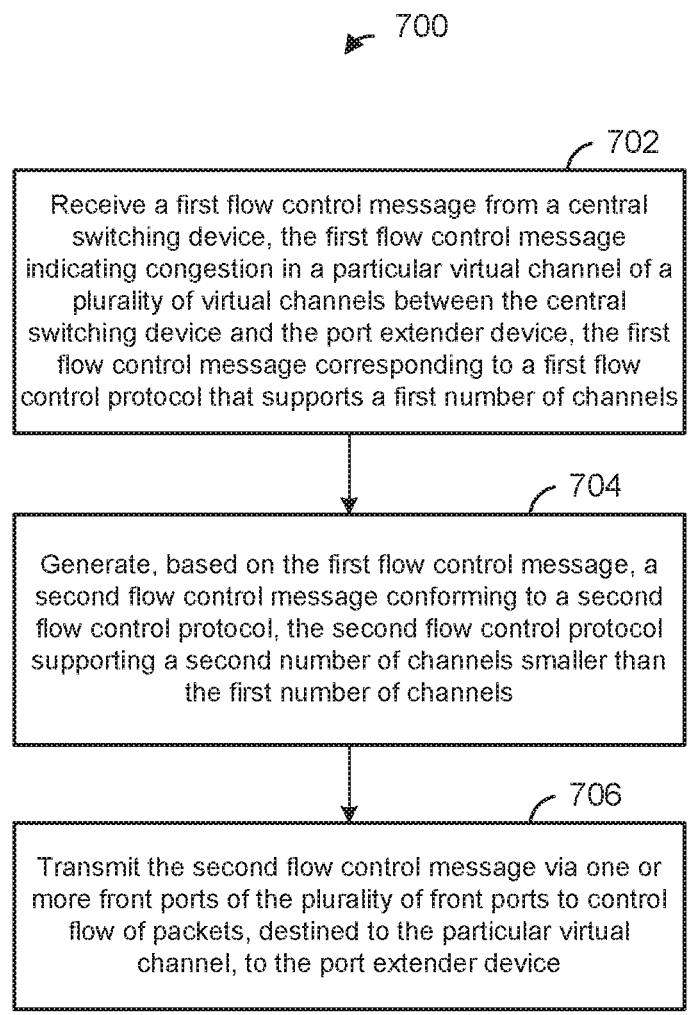
FIG. 7 is a flow diagram of an example method for controlling transmission of packets corresponding to a particular virtual channel of a plurality of virtual channels between a central switching device and a port extender device, according to an embodiment.

FIG. 7 is a flow diagram of an example method 700 for controlling transmission of packets in particular virtual channels of a plurality of virtual channels between a central switching device and a port extender device, according to an embodiment. In an embodiment, the method 700 is implemented by a port extender device. For example, each of one or more of the port extender devices 102 of FIG. 1 is configured to implement the method 700, in an embodiment. As another example, each of one or more of the port extender devices 202 of FIG. 2 is configured to implement the method 700, in an embodiment. In another embodiment, the method 700 is implemented by a port extender device different from the port extender devices 102 of FIG. 1 and the port extender devices 202 of FIG. 2. Similarly, a port extender device 102 of FIG. 1 or a port extender device 202 of FIG. 2 implements a method different from the method 700 to control transmission of packets in particular virtual channels of a plurality of virtual channels between a central switching device and the port extender device.

At block 702, the port extender device receives a first flow control message from a central switching device. The first flow control message indicates congestion in a particular virtual channel of the plurality of virtual channels from the central switching device to the port extender device. The first flow control message conforms to a first flow control protocol that supports a first number of virtual channels, in an embodiment. For example, the first flow control message conforms to a quantized congestion notification protocol that supports a relatively large number of virtual channels, in an embodiment.

At block 704, the port extender device generates a second flow control message based on the first flow control message received at block 702. The second flow control message conforms to a second flow control protocol different from the first flow control protocol. In an embodiment, the second flow control protocol supports a second number of channels smaller than the first number of channels supported by the first flow control protocol. For example, the second flow control message conforms to a priority flow control (PFC) protocol that supports a relatively small number of virtual channels corresponding to a number of priorities supported by the port extender device, in an embodiment.

At block 706, the port extender device transmits the second flow control message generated at block 704 via one or more front ports of the port extender device to one or more network devices coupled to the one or more front ports of the port extender device. In an embodiment, the second flow control message serves to control transmission of packets, from the one or more network devices, destined to a particular virtual channel between the central switching device and the port extender device. For example, in an embodiment, the second flow control message instructs the one or more network devices to pause transmission of packets of a particular priority to the port extender device.

In an embodiment, a port extender device comprises: a plurality of front ports configured to interface with a network; at least one uplink port for interfacing with a central switch device; a forwarding processor configured to forward packets, received via ones of the front ports, to a central switch device for processing of the packet by the central switch device; a plurality of egress queues for queueing packets processed by the central switch device and to be transmitted via the front ports of the port extender device, respective egress queues, among the plurality of egress queues, having a queue depth that is less than a queue depth of corresponding respective egress queues in the central switching device; and a flow control processor configured to selectively generate a flow control message indicative of congestion in a particular egress queue among the plurality of egress queues of the port extender device; and cause the flow control message to the transmitted to the central switch device to control transmission of packets from the central switching device to the particular egress queue of the port extender device.

In other embodiments, the port extender device further comprises any suitable combination of one or more of the following features.

The forwarding processor is configured to forward packets to the central switch device by causing the packets to be transmitted via the at least one uplink link to the central switch device.

The flow control processor is configured to cause the flow control message to be transmitted to the central switch device in-band using the at least one uplink link via which the packets are transmitted to the central switch.

The flow control processor is configured to detect a fill level of the particular egress queue when a new packet is placed in the particular egress queue, and selectively generate the flow control message to include an indication of the fill level of the particular egress queue.

The flow control processor is configured to detect a congestion level of the particular egress queue when a new packet is placed in the particular egress queue, and selectively generate the flow control message to include an indication of the congestion level of the particular egress queue.

The plurality of egress queues includes multiple subsets of multiple egress queues, respective subsets of multiple egress queues corresponding to respective front ports of the plurality of front ports, and wherein respective egress queues defining a subset of multiple egress queues correspond to respective packet priorities supported by the port extender device.

The flow control processor is configured to generate the flow control message to include (i) information indicative of a front port to which the particular egress queue corresponds and (ii) information indicative of a particular packet priority to which the particular egress queue corresponds.

In another embodiment, a method for controlling transmission of packets to a port extender device includes: receiving, at the port extender device from a central switching device, packets that are processed by the central switching device, the packets being for transmission via ones of front ports disposed in the port extender device; queueing, in the port extender device, the packets received from the central switching device in ones of a plurality of egress queues of the port extender device, respective one or more egress queues corresponding to respective front ports of the port extender device, respective egress queues among the plurality of egress queues having a queue depth that is less than a queue depth of corresponding respective egress queues in the central switching device; selectively generating a flow control message indicative of congestion in a particular egress queue of the plurality of egress queues of the port extender device; and causing the flow control message to be transmitted to the central switch device to control transmission of packets form the central switching device to the particular egress queue of the port extender device.

In other embodiments, the method includes any suitable combination of one or more of the following features.

The method further includes receiving, by the port extender device, packets via the front ports of the port extender device, and forwarding, by a forwarding processor of the port extender device via one or more uplink ports of the port extender device, the received packets to the central switching device for processing of the packets by the central switching device.

Causing the flow control message to be transmitted to the central switch device comprises causing the flow control message to be transmitted to the central switch device in-band via the at least one uplink port of the port extender device.

The method further includes detecting a fill level of the particular egress queue when a new packet is placed in the particular egress queue, and selectively generating the flow control message to include an indication of the fill level of the particular egress queue.

The method further includes detecting a congestion level of the particular egress queue when a new packet is placed in the particular egress queue, and selectively generating the flow control message to include an indication of the congestion level of the particular egress queue.

The plurality of egress queues includes multiple subsets of egress queues, respective subsets of multiple egress queues corresponding to respective front ports of the plurality of front ports, and wherein respective egress queues defining a subset of multiple egress queues correspond to respective packet priorities supported by the port extender device.

Generating the flow control message comprises generating the flow control message to include (i) information indicative of a front port to which the particular egress queue corresponds and (ii) information indicative of a particular packet priority to which the particular egress queue corresponds.

In yet another embodiment, a central switching device comprises: at least one port configured to interface with a port extender device, the port extender device comprising a plurality of front ports for interfacing with a network; a packet processor configured to process packets received from the at least one port extender device, the packets having been received by the at least one port extender device via ones of the plurality of front ports of the at least one port extender device; a plurality of egress queues for storing processed packets to be forwarded to the at least one port extender device for transmission of the processed packets via ones of the plurality of front ports of the at least one port extender device, respective ones of the egress queue having a queue depth that is greater than a queue depth of corresponding respective egress queues disposed in the port extender device; and a flow control processor configured to, responsively to a flow control message received from the port extender device, control transmission of packets to the port extender device from a particular one of the egress queues of the central switch device to prevent overflow of an egress queue of the port extender device corresponding to the particular one of the egress queues of the central switching device.

In other embodiments, the network device further comprises any suitable combination of one or more of the following features.

The flow control message indicates a fill level of the particular egress queue in the port extender device, and wherein the flow control processor is configured to, responsively to the flow control message, pause transmission of packets from the egress queue in the central switching device corresponding to the particular egress queue in the port extender device.

The flow control processor is further configured to, based on the fill level indicated in the flow control message, determine an amount of time for which to pause transmission of packets from the corresponding egress queue in the central switching device.

In still another embodiment, a method for controlling transmission of packets from a central switching device includes: receiving, by the central switch device from at least one port extender device coupled to the central switching device, packets received by the at least one port extender device via ones of a plurality of front ports of the at least one port extender device; processing, by a packet processor of the central switching device, the packets received from the at least one port extender device; queueing, by the packet processor, the processed packets in a plurality of egress queues of the central switching device, the egress queues of egress queues of the central switching corresponding to egress queues of the at least one port extender device, respective ones of the egress queue of the central switching device having a queue depth that is greater than a queue depth of corresponding respective egress queues of the at least one port extender device; and controlling, by a flow control processor of the central switching device responsively to a flow control message received from a port extender device of the at least one port extender devices, transmission of packets from a particular one of the egress queues of the central switch device to prevent overflow of a corresponding egress queue in the port extender device.

In other embodiments, the method includes any suitable combination of one or more of the following features.

The flow control message indicates a fill level of the particular egress queue in the port extender device, and wherein controlling, responsively to the flow control message, transmission of packets from the egress queue in the central switching device corresponding to the particular egress queue in the port extender device comprises pausing the transmission of packets from the egress queue in the central switching device corresponding to the particular egress queue in the port extender device.

The method further includes, based on the fill level indicated in the flow control message, determining an amount of time for which to pause transmission of packets from the corresponding egress queue in the central switching device.

In yet another embodiment, a port extender device comprises: a plurality of front ports for interfacing with a network; at least one uplink port for interfacing with a central switch device; a forwarding processor configured to forward packets, received via ones of the front ports, to a central switch device for processing of the packet by the central switch device; and a flow control processor configured to receive a first flow control message from the central switching device, the first flow control message indicating congestion in a particular virtual channel of a plurality of virtual channels between the central switching device and the port extender device, the first flow control message corresponding to a first flow control protocol that supports a first number of channels, generate, based on the first flow control message, a second flow control message conforming to a second flow control protocol, the second flow control protocol supporting a second number of channels smaller than the first number of channels, and transmit the second flow control message via one or more front ports of the plurality of front ports to control transmission of packets, corresponding to the particular virtual channel, to the port extender device.

In other embodiments, the port extender device further includes any suitable combination of one or more of the following features.

Respective subsets of virtual channels correspond to respective front ports of the port extender device.

The particular virtual channel is defined by an egress queue in the port extender device and a corresponding egress queue in the central switching device.

In still another embodiment, a method of flow control includes: receiving, by a flow control engine of a port extender device, a first flow control message from a central switching device, the first flow control message indicating congestion in a particular virtual channel of a plurality of virtual channels between the central switching device and the port extender device, the first flow control message corresponding to a first flow control protocol that supports a first number of channels; generating, by the flow control engine, based on the first flow control message, a second flow control message conforming to a second flow control protocol, the second flow control protocol supporting a second number of channels smaller than the first number of channels; and causing, by the flow control engine, the second flow control message to be transmitted via one or more front port of the plurality of front ports to control transmission of packets, corresponding to the particular virtual channel, to the port extender device.

In other embodiments, the method includes any suitable combination of one or more of the following features.

Respective subsets of virtual channels correspond to respective front ports of the port extender device.

The particular virtual channel is defined by an egress queue in the port extender device and a corresponding egress queue in the central switching device.

In still another embodiment, a switching system comprises: one or more port extender devices, respective port extender devices comprising a plurality of front ports interfacing to a computer network, and a plurality of first queues, respective subsets of the plurality of first queues corresponding to respective front ports of the plurality of front ports; and a switching device coupled to the at least one port extender device and configured to process packets received via ones of the front ports of the port extender device at least to determine other ones of the front ports of a first port extender device, or ones of front ports of a second port extender device, via which to transmit the packets, the switching device comprising a plurality of second queues, respective second queues of the switching device corresponding to respective first queues of the port extender device, wherein a buffer depth of the second queues at the switching device is greater than a buffer of corresponding first queues at the port extender device; and a flow control processor configured to selectively control a transmission of packets from ones of the second queues of the switching device to corresponding ones of the first queues of the one or more port extender devices to prevent an overflow of packets at the corresponding first queues of the port extender device.

In other embodiments, the switching system further comprises any suitable combination of one or more of the following features.

The flow control processor is configured to control transmission of packets from ones of the second queues of the switching device to corresponding ones of the first queues of the at least one port extender device in response to receiving in-band flow control messages from the port extender device.

The flow control processor is configured to control transmission of packets from a particular one of the second queues of the switching device to a corresponding particular one of the first queues of the one or more port extender devices by temporarily pausing transmission of packets directed to the particular one of the first queues of the one or more port extender devices.

At least some of the various blocks, operations, and techniques described above may be implemented utilizing hardware, a processor executing firmware instructions, a processor executing software instructions, or any combination thereof.

When implemented in hardware, the hardware may comprise one or more of discrete components, an integrated circuit, an application-specific integrated circuit (ASIC), a programmable logic device (PLD), etc.

When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

While the present invention has been described with reference to specific examples, which are intended to be illustrative only and not to be limiting of the invention, changes, additions and/or deletions may be made to the disclosed embodiments without departing from the scope of the invention. For example, one or more portions of methods or techniques described above may be performed in a different order (or concurrently) and still achieve desirable results.

What is claimed is:

1. A port extender device, comprising:
a plurality of front ports configured to interface with a network;
at least one uplink port for interfacing with a central switch device;
a forwarding processor configured to forward packets, received via ones of the front ports, to a central switch device for processing of the packet by the central switch device;
a plurality of egress queues for queueing packets processed by the central switch device and to be transmitted via the front ports of the port extender device, respective egress queues, among the plurality of egress queues of the port extender device, having a queue buffering capacity that is less than a queue buffering capacity of corresponding respective egress queues in the central switch device; and
a flow control processor configured to
selectively generate a flow control message indicative of congestion in a particular egress queue among the plurality of egress queues of the port extender device, and
cause the flow control message to be transmitted to the central switch device to control transmission of packets from the central switch device to the particular egress queue of the port extender device.

2. The port extender device of claim 1, wherein:
the forwarding processor is configured to forward packets to the central switch device by causing the packets to be transmitted via the at least one uplink link to the central switch device, and
the flow control processor is configured to cause the flow control message to be transmitted to the central switch device in-band using the at least one uplink link via which the packets are transmitted to the central switch.

3. The port extender device of claim 1, wherein the flow control processor is configured to:
detect a fill level of the particular egress queue when a new packet is placed in the particular egress queue, and
selectively generate the flow control message to include an indication of the fill level of the particular egress queue.

4. The port extender device of claim 1, wherein the flow control processor is configured to:
detect a congestion level of the particular egress queue when a new packet is placed in the particular egress queue, and
selectively generate the flow control message to include an indication of the congestion level of the particular egress queue.

5. A port extender device, comprising:
a plurality of front ports configured to interface with a network;
at least one uplink port for interfacing with a central switch device;
a forwarding processor configured to forward packets, received via ones of the front ports, to a central switch device for processing of the packet by the central switch device;
a plurality of egress queues for queueing packets processed by the central switch device and to be transmitted via the front ports of the port extender device, respective egress queues, among the plurality of egress queues of the port extender device, having a queue depth that is less than a queue depth of corresponding respective egress queues in the central switch device, wherein the plurality of egress queues includes multiple subsets of multiple egress queues, respective subsets of multiple egress queues corresponding to respective front ports of the plurality of front ports, and wherein respective egress queues defining a subset of multiple egress queues correspond to respective packet priorities supported by the port extender device; and
a flow control processor configured to
selectively generate a flow control message indicative of congestion in a particular egress queue among the plurality of egress queues of the port extender device, and
cause the flow control message to be transmitted to the central switch device to control transmission of packets from the central switch device to the particular egress queue of the port extender device.

6. The port extender device of claim 5, wherein the flow control processor is configured to generate the flow control message to include (i) information indicative of a front port to which the particular egress queue corresponds and (ii) information indicative of a particular packet priority to which the particular egress queue corresponds.

7. A method for controlling transmission of packets to a port extender device, comprising:
receiving, at the port extender device from a central switch device, packets that are processed by the central switch device, the packets being for transmission via ones of front ports disposed in the port extender device;
queueing, in the port extender device, the packets received from the central switch device in ones of a plurality of egress queues of the port extender device, respective one or more egress queues corresponding to respective front ports of the port extender device, respective egress queues, among the plurality of egress queues of the port extender device, having a queue buffering capacity that is less than a queue buffering capacity of corresponding respective egress queues in the central switch device;
selectively generating a flow control message indicative of congestion in a particular egress queue of the plurality of egress queues of the port extender device; and
causing the flow control message to be transmitted to the central switch device to control transmission of packets form the central switch device to the particular egress queue of the port extender device.

8. The method of claim 7, further comprising:
receiving, by the port extender device, packets via the front ports of the port extender device, and
forwarding, by a forwarding processor of the port extender device via one or more uplink ports of the port extender device, the received packets to the central switch device for processing of the packets by the central switch device; wherein
causing the flow control message to be transmitted to the central switch device comprises causing the flow control message to be transmitted to the central switch device in-band via the at least one uplink port of the port extender device.

9. The method of claim 7, further comprising:
    detecting a fill level of the particular egress queue when a new packet is placed in the particular egress queue, and
    selectively generating the flow control message to include an indication of the fill level of the particular egress queue.

10. The method of claim 7, further comprising:
    detecting a congestion level of the particular egress queue when a new packet is placed in the particular egress queue, and
    selectively generating the flow control message to include an indication of the congestion level of the particular egress queue.

11. A method for controlling transmission of packets to a port extender device, comprising:
    receiving, at the port extender device from a central switch device, packets that are processed by the central switch device, the packets being for transmission via ones of front ports disposed in the port extender device;
    queueing, in the port extender device, the packets received from the central switch device in ones of a plurality of egress queues of the port extender device, respective one or more egress queues corresponding to respective front ports of the port extender device, respective egress queues, among the plurality of egress queues of the port extender device, having a queue depth that is less than a queue depth of corresponding respective egress queues in the central switch device, wherein the plurality of egress queues includes multiple subsets of egress queues, respective subsets of multiple egress queues corresponding to respective front ports of the plurality of front ports, and wherein respective egress queues defining a subset of multiple egress queues correspond to respective packet priorities supported by the port extender device;
    selectively generating a flow control message indicative of congestion in a particular egress queue of the plurality of egress queues of the port extender device; and
    causing the flow control message to be transmitted to the central switch device to control transmission of packets form the central switch device to the particular egress queue of the port extender device.

12. The method of claim 11, wherein generating the flow control message comprises generating the flow control message to include (i) information indicative of a front port to which the particular egress queue corresponds and (ii) information indicative of a particular packet priority to which the particular egress queue corresponds.

* * * * *